(12) United States Patent
Billington

(10) Patent No.: US 9,196,998 B1
(45) Date of Patent: Nov. 24, 2015

(54) ELECTRICAL OUTLET COVER

(71) Applicant: Sam Billington, Gainesville, VA (US)

(72) Inventor: Sam Billington, Gainesville, VA (US)

( * ) Notice: Subject to any disclaimer, the term of this patent is extended or adjusted under 35 U.S.C. 154(b) by 180 days.

(21) Appl. No.: 13/909,687

(22) Filed: Jun. 4, 2013

Related U.S. Application Data

(60) Provisional application No. 61/793,778, filed on Mar. 15, 2013.

(51) Int. Cl.
*H01R 13/60* (2006.01)
*H01R 13/453* (2006.01)
*H02G 3/14* (2006.01)

(52) U.S. Cl.
CPC ............ *H01R 13/4538* (2013.01); *H02G 3/14* (2013.01)

(58) Field of Classification Search
CPC .... H02G 3/14; H01R 13/447; H01R 13/4536; H01R 25/006; H01R 23/025
USPC ............... 174/66, 67; 220/241, 242; 439/135, 439/136, 147, 535, 536, 538
See application file for complete search history.

(56) References Cited

U.S. PATENT DOCUMENTS

| | | | | |
|---|---|---|---|---|
| 2,510,745 A | * | 6/1950 | Kilgore | 174/67 |
| 4,603,932 A | * | 8/1986 | Heverly | 439/147 |
| 4,851,612 A | * | 7/1989 | Peckham | 174/67 |
| 5,045,640 A | * | 9/1991 | Riceman | 174/67 |
| 5,195,901 A | * | 3/1993 | Correnti | 439/147 |
| 5,252,083 A | * | 10/1993 | Correnti | 439/147 |
| 5,382,755 A | * | 1/1995 | Correnti | 174/67 |
| 5,594,208 A | * | 1/1997 | Cancellieri et al. | 174/58 |
| 5,703,329 A | * | 12/1997 | Delone | 174/67 |
| 7,179,996 B1 | * | 2/2007 | Britt et al. | 174/66 |
| 7,439,444 B1 | | 10/2008 | Maltby et al. | |
| 7,598,454 B1 | | 10/2009 | Baldwin et al. | |
| 8,088,999 B1 | | 1/2012 | Payou | |
| 8,097,805 B2 | | 1/2012 | Drane et al. | |
| 8,101,861 B1 | | 1/2012 | Shotey et al. | |
| 8,258,401 B1 | | 9/2012 | Shotey et al. | |
| 8,445,781 B1 | * | 5/2013 | Chasser | 174/67 |
| 8,912,442 B2 | * | 12/2014 | Smith | 174/66 |

* cited by examiner

*Primary Examiner* — Thanh Tam Le
(74) *Attorney, Agent, or Firm* — Robert C. Montgomery; Montgomery Patent & Design, LLC

(57) ABSTRACT

An electrical outlet cover assembly can include a plate configured to be connected to an electrical outlet, the plate including at least one outlet aperture configured to receive an electrical socket of the electrical outlet, a pair of rectangular hook apertures disposed through a lower end of the plate, and a pair of square clasp apertures disposed through an upper end of the plate, and a box configured to connect to the plate and cover the electrical outlet, the box including a pair of rigid hooks disposed at a lower end of the box, the pair of hooks being received by the pair of hook apertures, and a pair of spring clasps disposed at an upper end of the box, the pair of clasps being received by the pair of clasp apertures.

13 Claims, 4 Drawing Sheets

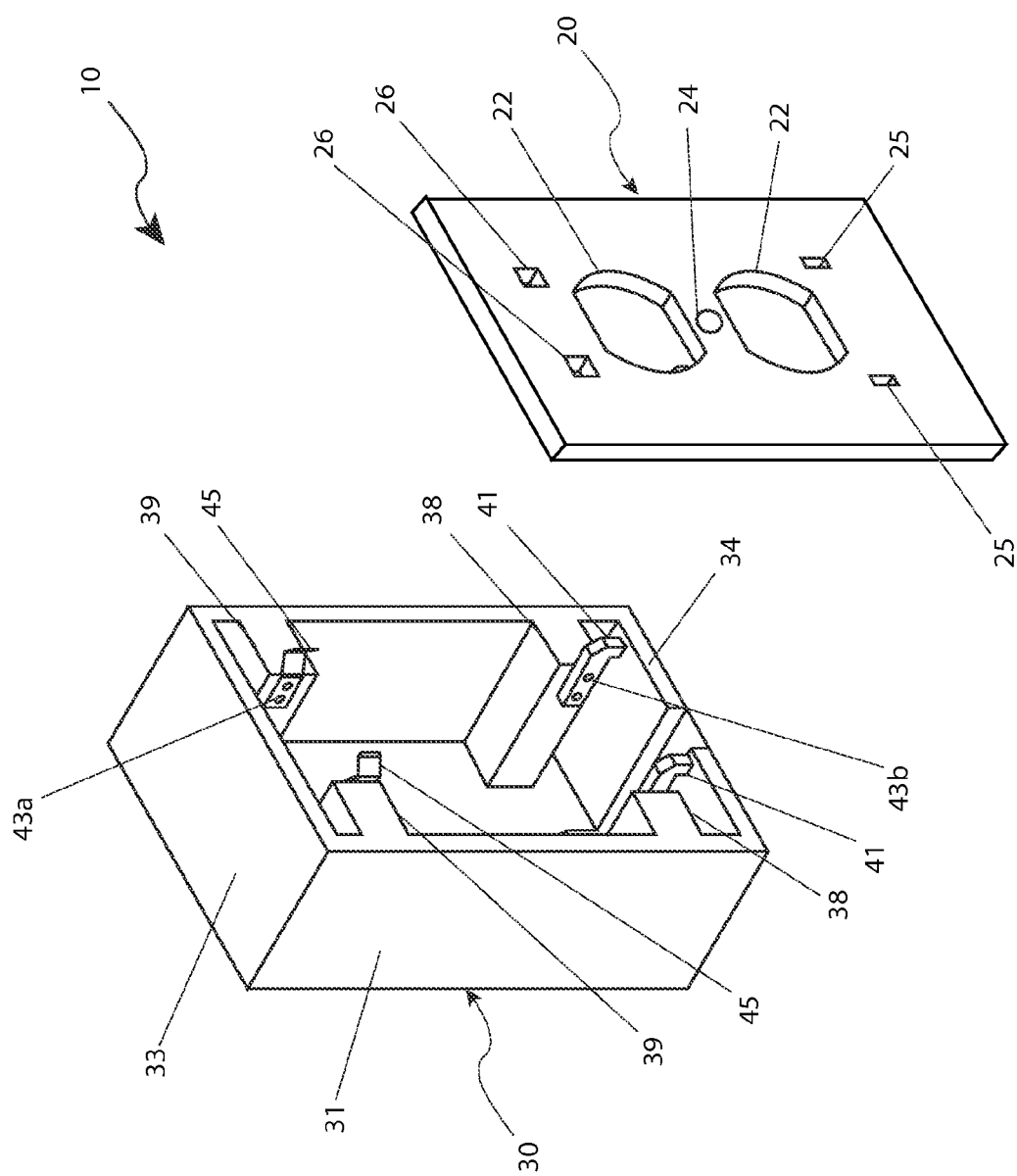

ELECTRICAL OUTLET COVER

RELATED APPLICATIONS

The present invention was first described in and claims the benefit of U.S. Provisional Application No. 61/793,778, filed Mar. 15, 2013, the entire disclosures of which are incorporated herein by reference.

FIELD OF THE INVENTION

The present invention relates generally to electrical outlet covers, and more particularly, to electrical outlet covers having a cover plate and an outlet box for retaining plugs in electrical communication with a wall outlet and retaining the plugs therein.

BACKGROUND OF THE INVENTION

Electrical outlets configured to supply electrical power via an electrically connected cord are well known. One (1) common and potentially dangerous feature of existing electrical outlets is that the electrical outlets are fully exposed. Thus, there is always danger of accidental electrocution when the outlets are exposed, for adults and children alike. Exposed outlets may allow someone, such as a young child, to stick objects into the outlet that may inadvertently shock the person. This could potentially be a life-threatening situation. Unfortunately, current outlets lack a reliable way to maintain utility of the electrical outlets, which also keeps the safety in check.

Accordingly, despite existing solutions there exists a need for an apparatus or device which provides maximum safety around an electrical outlet without compromising usability.

SUMMARY OF THE INVENTION

The inventor has recognized the aforementioned inherent problems and lack in the art and observed that there is a need for an apparatus or device configured to provide security for electrical outlets and that keeps electrical plugs connected to the wall outlet. The development of the present invention, which will be described in greater detail herein, substantially departs from conventional solutions to provide an electrical outlet cover and in doing so fulfills this need.

The disclosed electrical outlet cover includes a face plate and a detachable cover. The face plate would replace a standard wall cover on a conventional receptacle. The face plate will have the standard outlet apertures to allow use of the outlets. The face plate will also have a fastening aperture in the center of the face plate to allow attachment to the wall, as well as two (2) hook-and-clasp apertures. These apertures hold the hooks and clasps on the detachable cover, respectively.

The cover is constructed in the form of a rectangular box, with four (4) sides and a top portion. The side on the bottom includes a hole through which cords of the plugs can pass. The sides include hooks and clasps that correspond to the hook-and-clasp apertures on the face plate. The clasps are located on the upper portion of the cover, while the hooks are located on the lower portion of the cover. The clasps are made of spring steel and when properly affixed to the clasp mount extend from the rear of the box to engage in the clasp aperture of the plate to retain the box by spring force. The hooks are made of metal and extend from the cover to engage in the hook apertures on the face plate. Each of the two (2) hooks is provided with two (2) apertures for the insertion of fasteners to affix the hooks to the hook mounts. The fasteners can include a cylindrical shank with a flat head forced into a predrilled hole in the hook mount to retain the hook.

The disclosed electrical outlet cover can be utilized by an end user in a simple and straightforward manner with little or no training other than a stringent exercise of care with energized electrical circuits.

In one (1) embodiment, the disclosed electrical outlet cover assembly can include a plate configured to be connected to an electrical outlet and a box configured to connect to the plate and cover the electrical outlet. The box includes a plurality of attachment features configured to engage the plate. The plurality of attachment features includes a pair of hooks disposed at a lower end of the box and a pair of clasps disposed at an upper end of the box. The plate includes at least one outlet aperture configured to receive an electrical socket of the electrical outlet and a plurality of apertures configured to receive the plurality of attachment features of the box.

In another embodiment, the disclosed electrical outlet cover assembly can include an electrical outlet including at least one (1) electrical socket, a plate configured to be connected to the electrical outlet, and a box configured to connect to the plate and cover the electrical outlet.

In yet another embodiment, the disclosed electrical outlet cover assembly can include a plate configured to be connected to an electrical outlet, the plate including at least one (1) outlet aperture configured to receive an electrical socket of the electrical outlet, a pair of rectangular hook apertures disposed through a lower end of the plate, and a pair of square clasp apertures disposed through an upper end of the plate, and a box configured to connect to the plate and cover the electrical outlet, the box including a pair of rigid hooks disposed at a lower end of the box, the pair of hooks being received by the pair of hook apertures, and a pair of spring clasps disposed at an upper end of the box, the pair of clasps being received by the pair of clasp apertures.

Furthermore, the described features and advantages of the disclosed electrical outlet cover assembly can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 2 is an exploded rear perspective view of the disclosed electrical outlet cover assembly;

Figure 1:
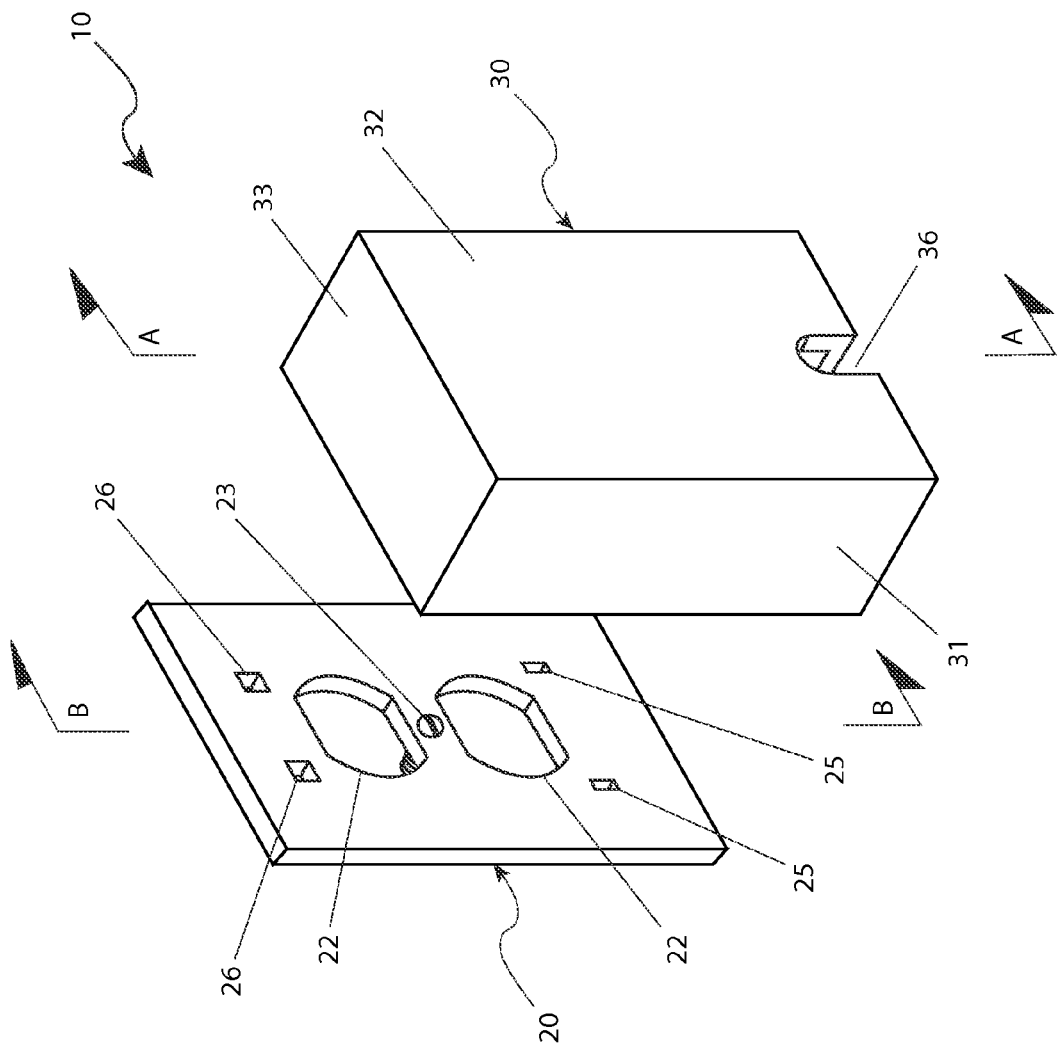
FIG. 1 is an exploded front perspective view of the disclosed electrical outlet cover assembly depicting a plate and a box in accordance with the present invention.

DESCRIPTIVE KEY 10 electrical outlet cover assembly
20 plate
22 outlet aperture
23 threaded fastener
24 fastener aperture
25 hook aperture
26 clasp aperture
30 box
31 side
32 front
33 top
34 bottom
36 cord slot
38 hook mount
39 clasp mount
41 hook
43a clasp fastener
43b hook fastener
45 clasp
100 outlet
101 plug
102 electrical cord

DETAILED DESCRIPTION OF THE PREFERRED EMBODIMENT

In accordance with the invention, the best mode is presented in terms of the described embodiments, herein depicted within FIGS. 1 through 4b. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring to FIGS. 1-4b, disclosing an electrical outlet cover assembly (herein referred to as the "assembly") 10, where like reference numerals represent similar or like parts. The assembly 10 is configured to provide at least some measure of protection against tampering with electrical plugs 101 of electrical cords 102 when electrically connected to an electrical outlet 100 and concurrent exposure to an electrical field.

Referring now to FIGS. 1 and 2, the assembly 10 includes a plate 20 and a box 30 which may be constructed of a rigid thermoplastic or composite material; however other materials are also contemplated. The plate 20 and the box 30 are configured as two (2) individual parts, for example fabricated in an injection molding process. The plate 20 is intended to replace a standard wall cover on a conventional 115-V duplex receptacle. One skilled in the art will appreciate that alternate embodiments can easily be developed to include the use of a plurality of duplex receptacles in a gang fashion, receptacles of a higher voltage, or specialized receptacles, without limitation.

Alternate embodiments of the plate 20 may provide for the inclusion of decorative, or informative, designs on either face of the plate 20 (such as the word UP to indicate a correct orientation) without limiting the scope.

The plate 20 includes at least one standard rounded outlet aperture 22 (two are shown in the FIGS. 1 and 2) and at least one fastener aperture 24. The plate 20 also includes two (2), rectangular, hook apertures 25 and two (2), generally square, clasp apertures 26. The hook apertures 25 and the clasp apertures 26 are configured to retain hooks 41 and the clasps 45 projecting from the box 30.

The box 30 includes a top 33, a bottom 34, and two (2) sides 31 joined along horizontal abutting edges. The box 30 may be a one piece member (e.g., molded) with a vertical front 32 and an open back. Disposed in the bottom 34, running from the open back to the front 32 is at least one cord slot 36. The cord slot 36 is configured to provide for the disposition of an electrical cord 102 with a plug 101 inserted into the outlet 100, as shown in FIG. 4a.

Alternate embodiments may provide for the inclusion of decorative or informative designs on the interior or exterior faces of the box 30 without limiting the scope.

Figure 3B:
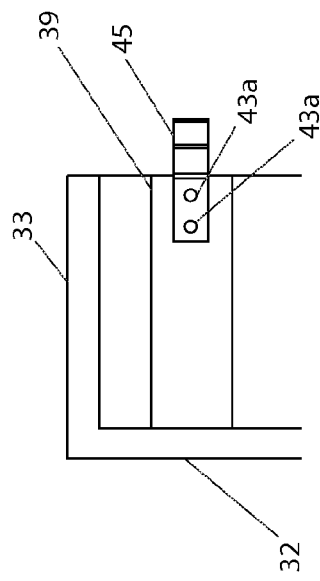
FIG. 3b is a close-up of a clasp of the box of the disclosed electrical outlet cover assembly.
Figure 3C:
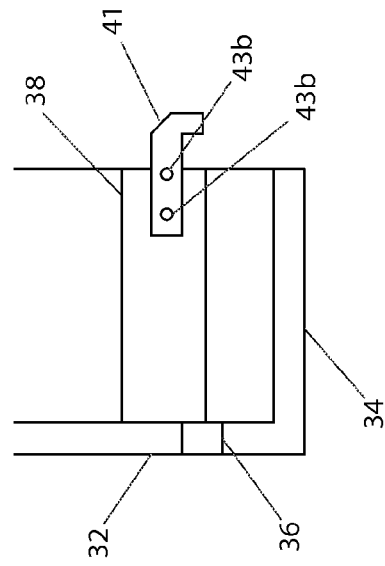
FIG. 3c is a close-up of a hook of the box of the disclosed electrical outlet cover assembly.
Figure 3A:
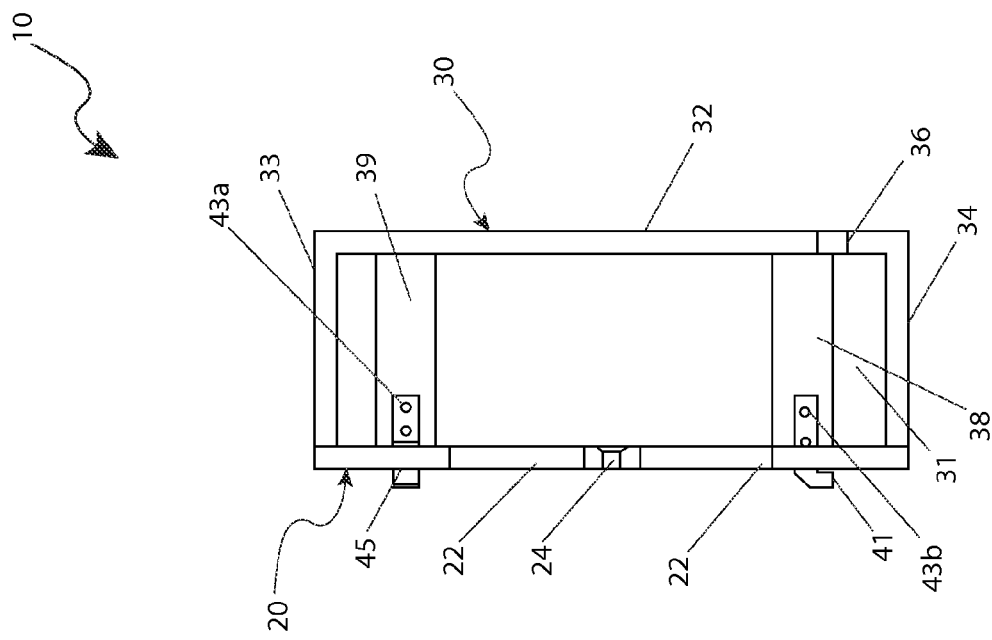
FIG. 3a is a side cross sectional view of the disclosed electrical outlet cover assembly taken along lines A-A and B-B of FIG. 1.

Molded onto the interior face of each side 31 and joining with the front 32 are two (2) rectangular protrusions as seen in FIG. 3a. The lower protrusion on each side 31 is the hook mount 38 which provides an attachment surface for the hook 41 as seen in FIG. 3c. The hook 41 can be made of molded or stamped metal, thermoplastic material, or any other durable material without limitation. When affixed or otherwise connected to the hook mount 38, each hook 41 extends from the rear of the box 30 to engage into the hook aperture 25 of the plate 20 to support and retain the box 30 in the preferred position as seen in FIG. 4a.

Each of the two (2) hooks 41 is provided with two (2) apertures for the purpose of the insertion of fasteners 43*b* to affix the hooks 41 to the hook mounts 38. The fasteners 43*b* can include a cylindrical shank with a flat head which is received by a predrilled hole in the hook mount 38 to retain the hook 41. Alternate embodiments of the fasteners 43*b* could incorporate a twisted square shank, or a single, or multiple, rib wrapped in a helix around a cylindrical shank, or a threaded fastener.

The upper protrusion on each side 31 is the clasp mount 39 which provides an attachment surface for the clasp 45 as seen in FIG. 3*b*. The clasp 45 can be made of spring steel and when properly affixed to the clasp mount 39 extends from the rear of the box 30 to engage in the clasp aperture 26 of the plate 20 to retain the box 30 (e.g., by spring force) in position as seen in FIG. 4*a*. Each of the two (2) clasps 45 is provided with two (2) apertures for the purpose of the insertion of fasteners 43*a* to affix said clasps 45 to the clasp mounts 39.

It is envisioned that other styles and configurations of the disclosed assembly 10 can be easily incorporated into the teachings of the present disclosure, and only certain particular configurations have been shown and described for purposes of clarity and disclosure and not by way of limitation of scope.

The disclosed assembly 10 can be installed and utilized by the user in a simple and effortless manner with little or no training. After initial purchase or acquisition of the assembly 10, it can be utilized as indicated in FIGS. 1-4*b*.

An example use of the disclosed assembly 10 involves replacement of an original wall plate around a selected outlet 100 with the plate 20, and therefore it may be a cautionary measure to de-energize the electrical circuit(s) of the outlet 100 prior to that action.

Figure 4B:
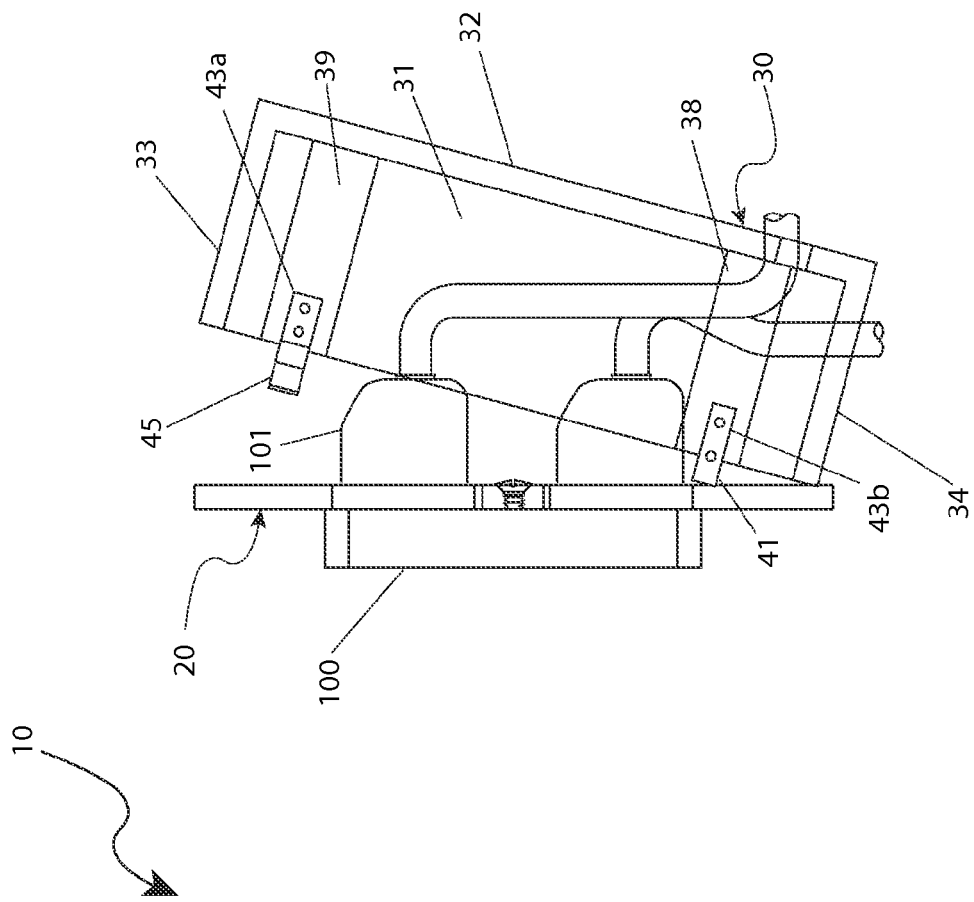
FIG. 4a is a side cross-sectional view of the electrical outlet cover assembly taken along line A-A and B-B of FIG. 1 depicted with electrical cords plugged into an electrical outlet in accordance with the present invention; and, FIG. 4b is a side cross sectional view of the electrical outlet cover assembly taken along line A-A and B-B of FIG. 1 depicting the box being installed onto the plate with electrical cords plugged into an electrical outlet in accordance with the present invention.
Figure 4A:
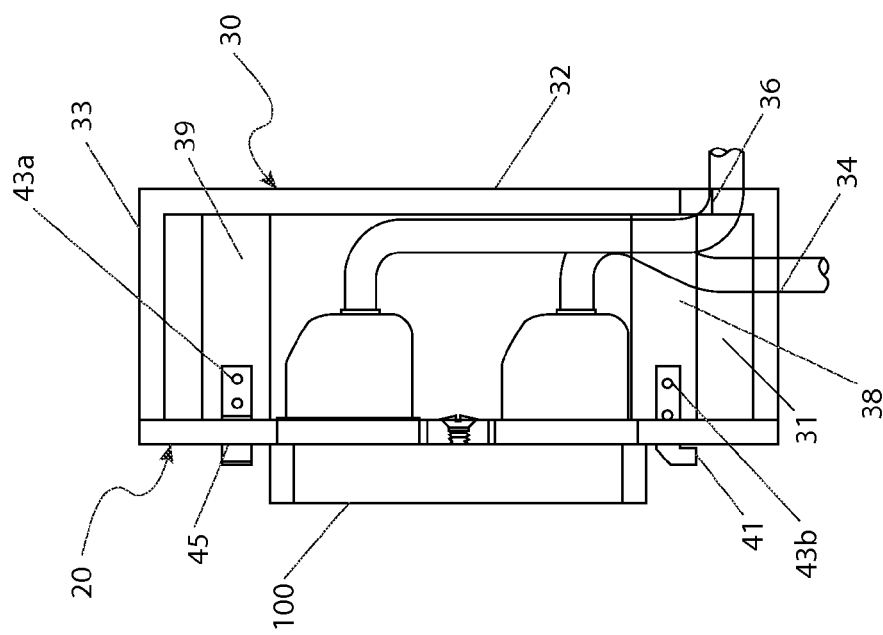

The method of installing and utilizing the assembly 10 may be achieved by performing the following steps: acquiring a model of the assembly 10 having the desired style as dictated by the application or the taste of the user; removing the threaded fastener from the original wall plate; replacing the original wall plate with the plate 20, ensuring that the rectangular hook apertures 25 are oriented at the bottom; reinstalling a threaded fastener 23 to secure the plate 20; inserting the plug 101 of the items to be electrically energized into the chosen outlet 100; inserting the hooks 41 into the hook apertures 25 in the plate 20 (e.g., one hook 41 received by each aperture 25), as seen in FIG. 4*b*, ensuring that the electrical cord 102 is correctly positioned within the cord slot 36 of the box 30; rotating the box 30 to cover the outlet 100 and the plugs, as seen in FIG. 4*b*; engaging the clasps 45 into the clasp apertures 26 in the plate 20 as seen in FIG. 4*a*; and reenergizing the electrical circuit(s) of the outlet 100.

Another example use of the assembly 10 may involve installing the cover 20 and the box 30 as previously described without installing the plug 101 of any electrical cord 102 into the outlet 100. This will provide a measure of protection against the unwanted exposure of an experientially challenged individual to the electrical field of the outlet 100.

The foregoing embodiments of the disclosed electrical outlet cover have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. An electrical outlet cover assembly comprising:
    a plate configured to be connected to an electrical outlet, said plate comprising:
        a plate top and a plate bottom opposite said plate top;
        a pair of square clasp apertures disposed through said plate near said plate top;
        a pair of rectangular hook apertures disposed through said plate near said plate bottom; and,
    a box configured to connect to said plate and cover said electrical outlet, said box comprising;
        a box top, a box bottom opposite said box top, and box sides;
        a pair of flexible clasps disposed near said box top, each of said pair of clasps being biased outwardly toward said box sides for releasable engagement within said pair of clasp apertures;
        a pair of rigid hooks disposed near said box bottom, each of said pair of hooks comprising a downwardly hooked end being removably received within said pair of hook apertures,
    wherein said pair of hook apertures support said pair of hooks to support said box on said plate, and
    wherein said pair of clasp apertures retain said pair of clasps to retain said box on said plate.

2. The assembly of claim 1, wherein said plate further comprises
    at least one outlet aperture configured to receive an electrical socket of said electrical outlet.

3. The assembly of claim 1, wherein said box comprises a top wall at said box top, a bottom wall at said box bottom opposite said top wall, a pair of laterally opposed side walls, and a front wall, and wherein said walls define an internal volume.

4. The assembly of claim 3, wherein each side wall of said pair of side walls comprises an upper protrusion near said top wall and a lower protrusion near said bottom wall, each protrusion extending outwardly toward an opposing side wall, wherein each one of said pair of clasps is connected to said upper protrusion, and wherein each one of said pair of hooks is connected to said lower protrusion.

5. The assembly of claim 4,
    wherein each hook of said pair of hooks and each clasp of said pair of clasps extend outwardly from said internal volume of said box.

6. The assembly of claim 1, wherein said box comprises a cord slot disposes in said bottom wall.

7. An electrical outlet cover assembly comprising:
    an electrical outlet comprising at least one electrical socket;
    a plate connected to said electrical outlet, said plate comprising:
        a plate top and a plate bottom opposite said plate top;
        a pair of square clasp apertures disposed through said plate near said plate top;
        a pair of rectangular hook apertures disposed through said plate near said plate bottom; and,
    a box removably connected to said plate and cover said electrical outlet, said box comprising;
        a box top, a box bottom opposite said box top, and box sides;

a pair of flexible clasps disposed near said box top, each of said pair of clasps being biased outwardly toward said box sides for releasable engagement within said pair of clasp apertures;

a pair of rigid hooks disposed near said box bottom, each of said pair of hooks comprising a downwardly hooked end being removably received within said pair of hook apertures, wherein said pair of hook apertures support said pair of hooks to support said box on said plate, and wherein said pair of clasp apertures retain said pair of clasps to retain said box on said plate.

8. The assembly of claim 7, wherein said box comprises a cord slot configured to receive a cord of an electrical plug connected to said electrical socket.

9. The assembly of claim 7, wherein said box comprises a top wall, a bottom wall opposite said top wall, a pair of laterally opposed side walls, and a front wall, and wherein said walls define an internal volume.

10. The assembly of claim 9, wherein each side wall of said pair of side walls comprises an upper protrusion and a lower protrusion, each protrusion extending outwardly toward an opposing side wall, wherein each one of said pair of clasps is connected to said upper protrusion, and wherein each one of said pair of hooks is connected to said lower protrusion.

11. The assembly of claim 10, wherein each hook of said pair of hooks and each clasp of said pair of clasps extend outwardly from said internal volume of said box.

12. The assembly of claim 9, wherein said box comprises a cord slot disposes in said bottom wall and configured to receive a cord of an electrical plug connected to said electrical socket.

13. The assembly of claim 7, wherein said plate comprises a fastening aperture.

* * * * *